US007478188B2

(12) United States Patent
Patton

(10) Patent No.: US 7,478,188 B2
(45) Date of Patent: Jan. 13, 2009

(54) SYSTEM AND METHOD FOR CONNECTING A WUSB DEVICE TO MULTIPLE WUSB HOSTS

(75) Inventor: David B. Patton, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/446,437

(22) Filed: Jun. 2, 2006

(65) Prior Publication Data

US 2007/0283075 A1 Dec. 6, 2007

(51) Int. Cl.
*G06F 13/00* (2006.01)
(52) U.S. Cl. .................... 710/300; 710/305; 710/306; 713/300; 455/41
(58) Field of Classification Search ............. 710/315, 710/100, 300, 305–306; 455/41, 445; 713/300
See application file for complete search history.

(56) References Cited

U.S. PATENT DOCUMENTS

| 6,725,302 | B1 | 4/2004 | Benayoun et al. |
| 6,728,601 | B2 | 4/2004 | Garcia et al. |
| 6,898,652 | B2 | 5/2005 | Peters et al. |
| 6,941,114 | B1 | 9/2005 | Kuo et al. |
| 7,089,434 | B2 * | 8/2006 | Kuo ............................ 713/300 |
| 2004/0203415 | A1 | 10/2004 | Wu |
| 2005/0192013 | A1 * | 9/2005 | Perrot et al. ................. 455/445 |
| 2006/0020723 | A1 | 1/2006 | Chia-Chun |
| 2006/0035590 | A1 * | 2/2006 | Morris et al. ............... 455/41.2 |
| 2006/0075271 | A1 * | 4/2006 | Lilja et al. ................... 713/322 |
| 2006/0083234 | A1 | 4/2006 | Sung et al. |
| 2006/0092899 | A1 * | 5/2006 | Hong et al. .................. 370/338 |
| 2006/0149858 | A1 * | 7/2006 | Bhesania et al. ............... 710/5 |
| 2006/0271798 | A1 * | 11/2006 | Tandon ........................ 713/300 |
| 2007/0066314 | A1 * | 3/2007 | Sherman et al. ............. 455/445 |

OTHER PUBLICATIONS

Kolic, Rafael, "Wireless USB Brings Greater Convenience and Mobility to Devices", Technology@Intel Magazine, Feb./Mar. 2004, pp. 1-7 (www.Intel.com/technology/magazine).
"Introducing Certified Wireless USB From the USB-IF", 2004, pp. 1-2 (www.usb.org/developers/wusb/About).

* cited by examiner

*Primary Examiner*—Clifford H Knoll
*Assistant Examiner*—Kim T Huynh

(57) ABSTRACT

A system for simultaneously associating a wireless USB device with multiple wireless USB hosts includes a wireless USB device, a plurality of wireless USB hosts, and means for simultaneously interconnecting the wireless USB device with more than one of the wireless USB hosts. A method for connecting a wireless USB (WUSB) device to multiple WUSB hosts includes the steps of connecting the wireless USB device to a first WUSB host and putting the connection with the first WUSB host into a pseudo sleep mode, scanning a radio frequency spectrum for a new WUSB host that is available for connection to the device, connecting the device to the new WUSB host, and putting the connection with the new WUSB host into a pseudo sleep mode.

20 Claims, 3 Drawing Sheets

SYSTEM AND METHOD FOR CONNECTING A WUSB DEVICE TO MULTIPLE WUSB HOSTS

BACKGROUND

Most computers on the market today include one or more Universal Serial Bus (USB) connectors. These USB connectors allow a user to quickly and easily attach a wide variety of peripheral devices to a personal computer, such as a mouse, a printer, a digital camera, etc. The operating system of the computer is configured to support USB, so that the installation of the drivers for these various peripheral devices is quick and easy. Compared to other ways of connecting devices to a computer (including parallel ports, serial ports and special cards that are installed inside the computer's case), USB devices are relatively simple. The Universal Serial Bus provides a single, standardized, easy-to-use way to connect up to 127 different devices to a computer.

Unfortunately, as a practical matter, there is not space on a typical personal computer to include 127 USB ports, and the required hardware would greatly increase the cost of the computer. Consequently, computers typically include only a small number of USB ports. This condition becomes a drawback when a user desires to connect more USB devices to the host computer than there are physical USB ports on the computer. While USB technology initially became a popular connection type for PCs and related peripherals, USB technology has more recently migrated into consumer electronics (e.g. home theater systems) and mobile devices (e.g. mobile phones and PDA's). Consequently, the problem of how to connect USB devices to a host is increasing as the number, variety and popularity of USB devices grows.

One solution to this problem that is now coming into use is wireless USB (WUSB). Wireless USB allows multiple peripheral devices within a certain proximity to connect to a host via ultra wideband (UWB) radio signals, without the need for a physical wire interconnecting the host and the device. Under one WUSB specification, hosts and devices should be able to communicate at a rate of up to 480 Mbps at a range of 3 meters, and up to 110 Mbps at a range of 10 meters. This wireless connectivity not only eliminates the inconvenience of physical cables, but also opens up the host device to interconnection to a larger number of devices, without having to have many USB ports. Industry groups have come together to develop standards and specifications for WUSB, and devices enabled for WUSB are expected to be publicly available in 2006. One specification that has been developed and is expected to be widely followed is the Certified Wireless USB format from the USB Implementers Forum.

BRIEF DESCRIPTION OF THE DRAWINGS

Various features and advantages of the invention will be apparent from the detailed description which follows, taken in conjunction with the accompanying drawings, which together illustrate, by way of example, features of the invention, and wherein.

DETAILED DESCRIPTION

Figure 1:
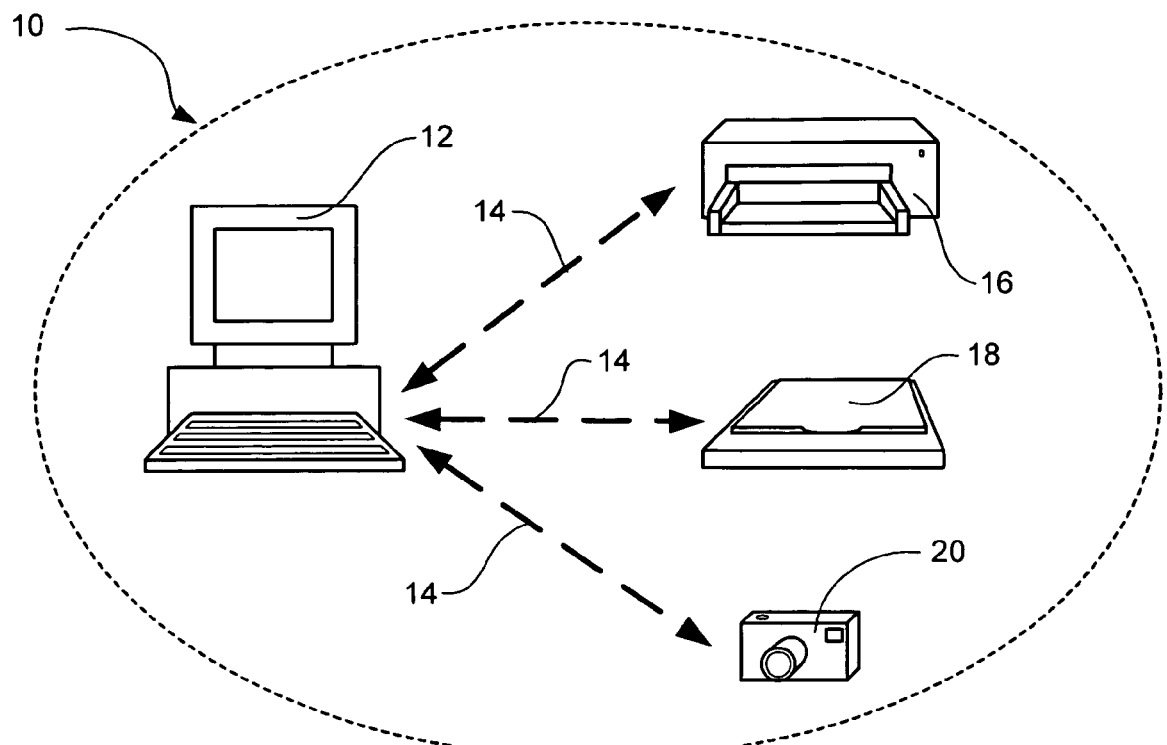
FIG. 1 is a diagram of a wireless USB cluster comprising one host and multiple WUSB devices.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

Wireless USB has the potential to become a very easy-to-use wireless interface for ad-hoc connections to many devices. For example, it can enable easy walk-up and print experiences. Unfortunately, while current wireless USB specifications allow one WUSB host to connect to multiple WUSB devices, they only allow each WUSB device to connect to one and only one WUSB host. However, it can be desirable to allow a WUSB device to simultaneously connect to multiple hosts. For example, if a user has a WUSB-enabled printer (or other peripheral) at home, and uses WUSB to permanently connect the printer to their desktop PC, there is no obvious way that another PC can also connect to that same printer. This is very inconvenient if the user, for example, approaches the printer with a laptop and desires to print to the printer using the laptop's embedded WUSB host port.

As with wired USB, under current standards, only one WUSB host can connect to a WUSB device. With wired USB the solution is to move the USB cable from one host to another host. This is the same model used in WUSB. With WUSB as it is currently defined, it is necessary to disconnect one host from a device before another host can connect to it. In the above example, to connect the laptop computer to the WUSB printer, the printer will first have to be "disconnected" from the first PC, and only then can the second PC connect to the printer. There are currently no solutions described in the WUSB spec that allow a WUSB device to connect to multiple WUSB hosts.

However, since there are no wires with a WUSB connection, it can be easy to forget which host a device is connected to, or whether it is connected to a host at all. If the device is connected to one host and another host attempts to connect to the device, the connection will not be allowed. These are all complications inherent in the WUSB spec, as currently defined, that limit its ease-of-use.

Advantageously, the inventor has developed a system and method for simultaneously connecting a WUSB device to multiple hosts. By incorporating this capability into WUSB devices, a device can be connected to multiple hosts without going through a cumbersome "disconnect" and "reconnect" process. This approach will be much more convenient for the user, and will enable true ad-hoc connections between hosts and devices.

Before proceeding further with the detailed description, it is important to define some relevant terminology. As used herein, the term "host" refers to a computer or other digital apparatus that sends data to and receives data from a WUSB device.

As used herein, the term "device" refers to a WUSB apparatus that is interconnected to a host.

As used herein, the term "data host" refers to a host that has data to be exchanged with a WUSB device.

As used herein, the term "cluster" refers to a group comprising a single host and one or more WUSB devices.

As used herein, the term "wake" refers to the active mode of a WUSB device when it is exchanging data with a host.

As used herein, the term "pseudo sleep" refers to a low power mode adopted by a WUSB device when interconnected to a host, but not actively sending or receiving data, and in which signals are sent to the host(s) as if the device were in true sleep mode, but during which the device periodically searches for new hosts. The pseudo sleep mode is distinguished from a true "sleep" mode, which is intended for conserving power, and in which the WUSB device periodically wakes to check to for new data from a connected host, but otherwise remains inactive.

As noted above, the current WUSB specification provides no method for allowing one WUSB device to connect to multiple WUSB hosts. The conventional WUSB connection model is illustrated in FIG. 1. As shown here, a WUSB cluster 10 includes a host device 12, which in this case is illustrated as a personal computer, which is wirelessly interconnected (the wireless interconnection being represented by dashed arrows 14) to multiple peripheral devices, such as a printer 16, a scanner 18, and a digital camera 20. It will be apparent that the devices shown in FIG. 1 are only exemplary of the wide variety of devices that can be configured according to WUSB specifications and associated with a WUSB host in this manner.

Unfortunately, if a user desires to interconnect one of the devices in the cluster 10 to a different host, the connection to the first host 12 must first be broken, after which the second host can be connected. Thus, if it is desired to interconnect the printer 16 to a different PC (not shown) to allow that other PC to send print jobs to the printer, an entire series of steps must be followed to first break the connection with the host 12, after which a similar series of steps must be followed to connect the printer to the other different host. This can present great inconvenience in many situations, such as in offices where certain peripherals are shared by multiple individual computers, or where one individual uses two different computers (e.g. a desktop computer and a laptop computer) and wants to share a group of peripheral devices with both. In such situations, it may be simpler to retain bulky and awkward wired connections to networks and the like to allow multiple hosts to deal with individual devices, which negates some of the benefits of wireless USB.

Figure 2:
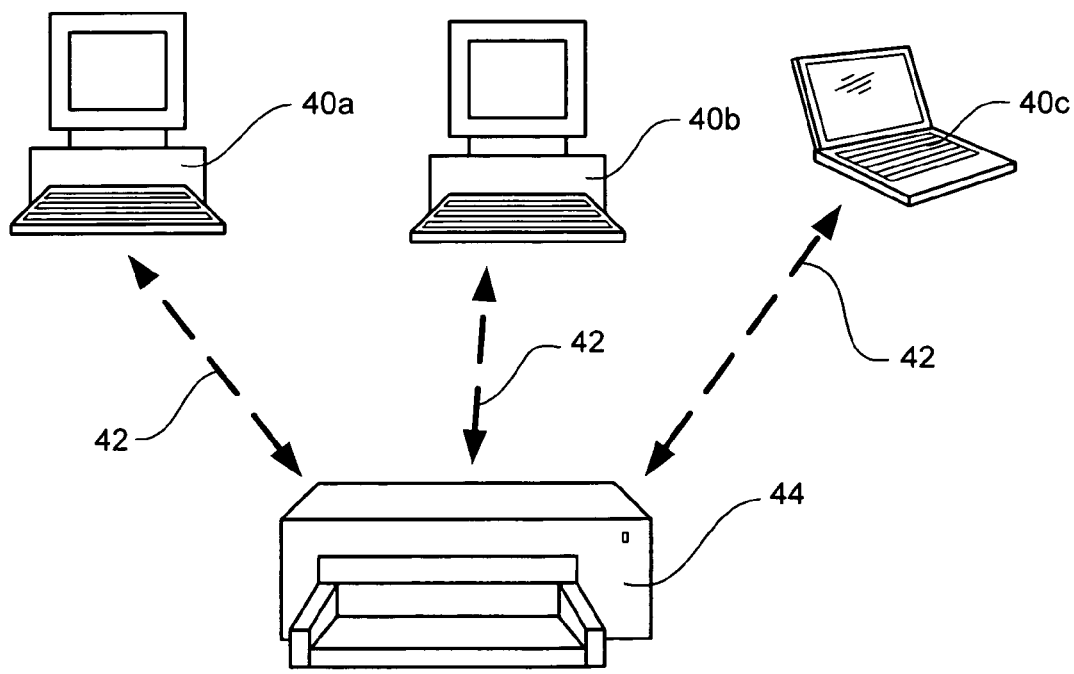
FIG. 2 is a diagram of multiple wireless USB hosts linked with a single WUSB device in accordance with an exemplary embodiment.
Figure 3:
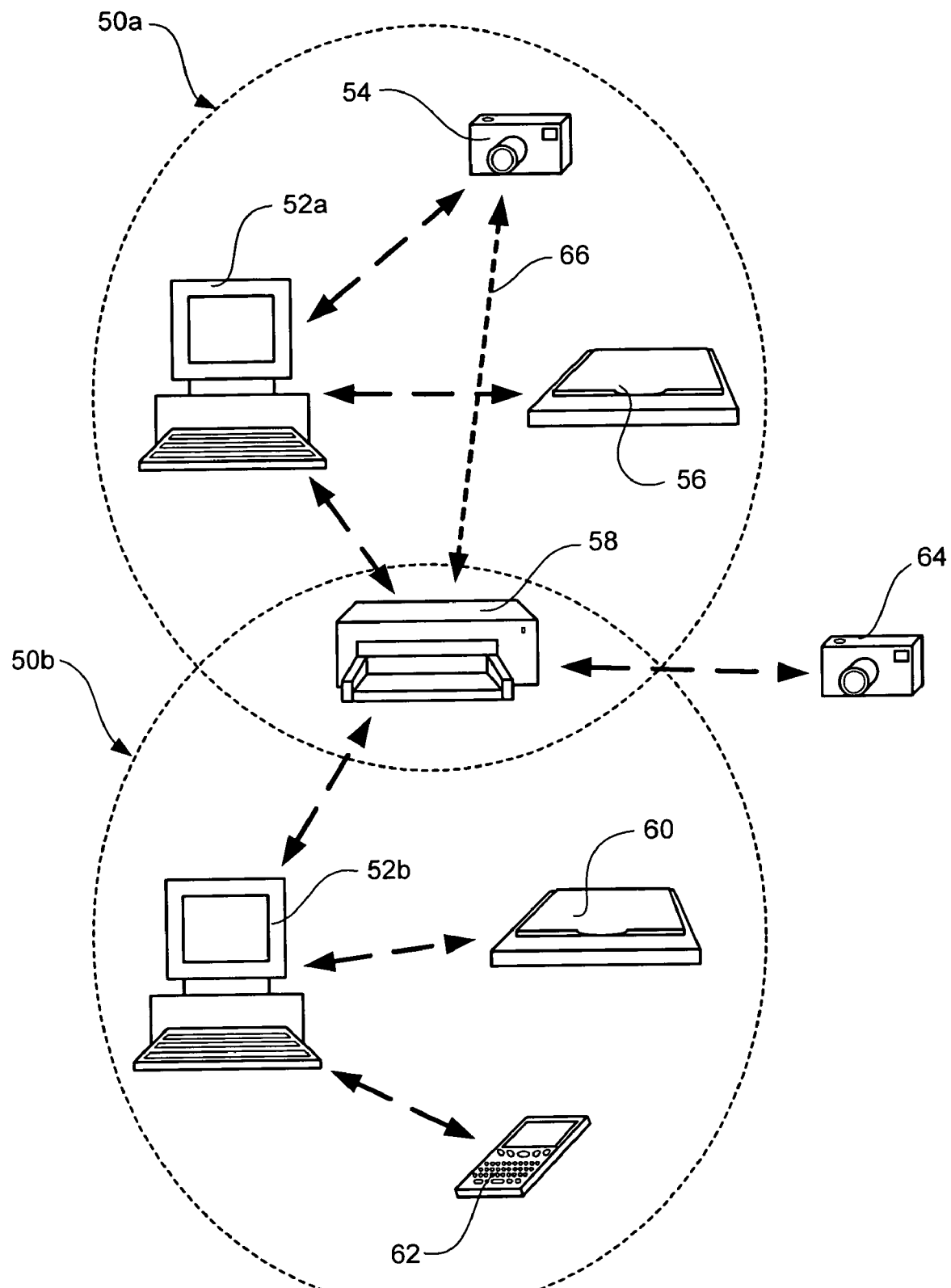
FIG. 3 is a diagram of two WUSB clusters, each having a host, in which one WUSB device is linked to both hosts, and shared by both clusters, in accordance with an exemplary embodiment.

Advantageously, the inventor has developed a system and method whereby one WUSB device can be simultaneously connected to multiple WUSB hosts. This sort of system is depicted in FIGS. 2 and 3. As shown in FIG. 2, three wireless USB hosts 40a-40c are wirelessly linked (represented by dashed arrows 42) with a single WUSB device 44, shown in this illustration as a printer device. While three hosts are shown connected to a single WUSB device in this illustration, it will be apparent that this is not a limit to the number of WUSB hosts that can be connected in this manner.

Similarly, shown in FIG. 3 are two WUSB clusters 50a, 50b which overlap. In this configuration, each cluster includes a host 52a, 52b, which in this illustration are shown as personal computers. The first WUSB host 52a is linked to a camera 54, a scanner 56, and a printer 58. The second WUSB host 52b is also linked to the printer 58, and also to a scanner 60 and a PDA 62. As shown, both hosts 52a and 52b are linked to the printer 58, such that this device is shared by both clusters 50a, 50b. While in FIG. 3 both clusters share a single device, it will be apparent that multiple devices can be shared by two or more clusters.

The system and method disclosed herein takes advantage of a low power mode of the WUSB device to enable the device to connect to multiple hosts on multiple networks. It does this by first replacing the true sleep mode of the device with a pseudo sleep mode, in which the device periodically searches for and connects to new hosts, in addition to periodically waking to search for new data, as happens in the normal sleep mode. With this system a wireless USB device is able to attach to multiple hosts without disconnecting from any of them.

Figure 4:
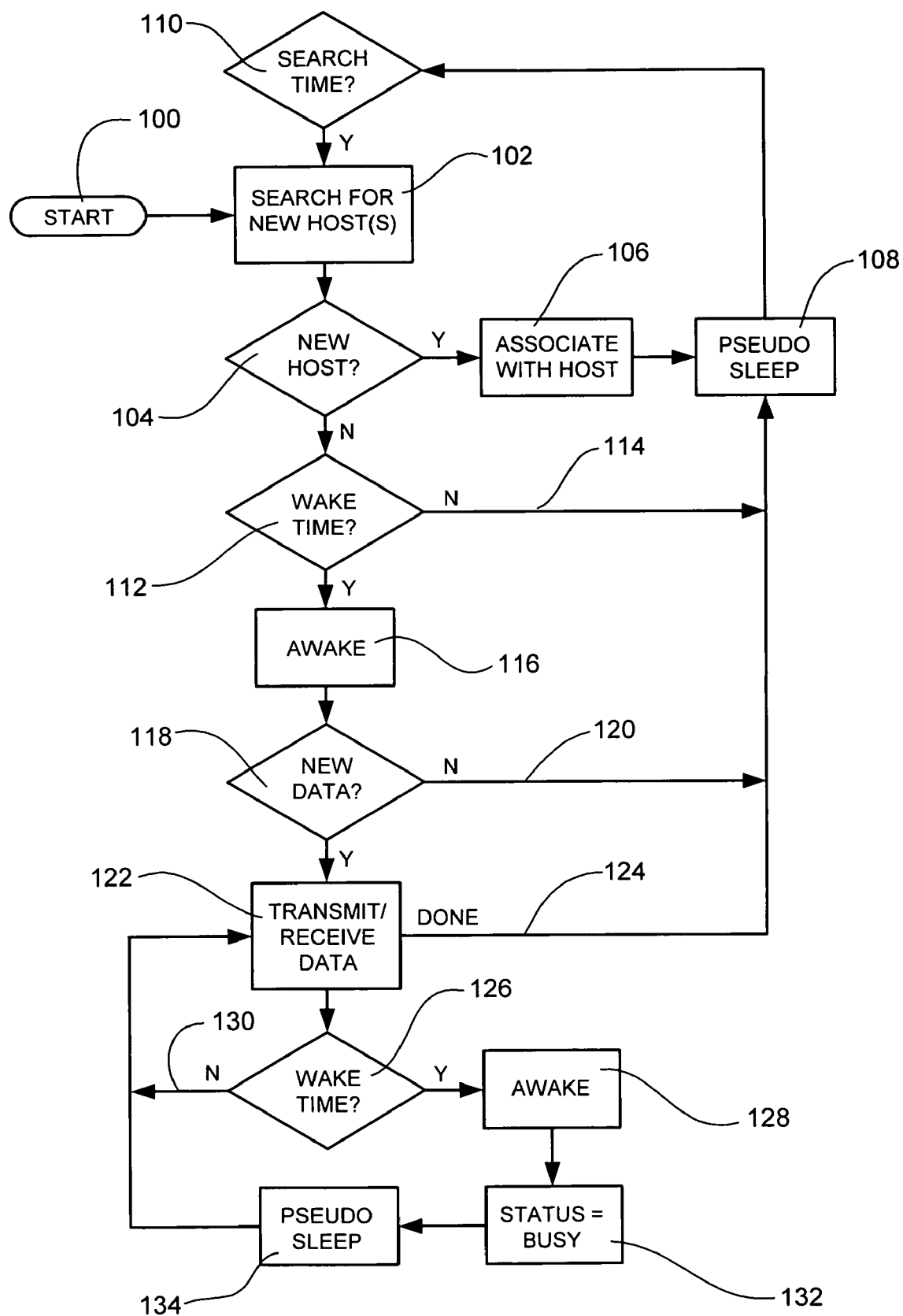
FIG. 4 is a flow chart illustrating the steps by which a single WUSB device simultaneously links to multiple hosts in accordance with an exemplary embodiment.

Provided in FIG. 4 is a flow chart depicting the steps in one embodiment of the method for connecting one WUSB device to multiple hosts. The steps shown in this method are performed by microprocessor elements of the WUSB device, and the presumption is that the device is already associated with at least one host. When the device is initialized (at START step 100), it first searches for any new hosts (steps 102, 104). This is done by scanning for hosts across the entire UWB spectrum that is allotted for WUSB devices, as is normally done by any WUSB device. If a new host is found, the device connects to and associates with that host (step 106). When a new host is found, the device then requests the host to allow the device to go into a low-power sleep mode. The device does not actually go into a true "sleep" mode, which is intended for conserving power, but actually goes into a pseudo sleep mode (step 108). With devices operating under the Certified Wireless USB specifications, the connected host will think that the device is in sleep mode. Under these specifications, when a device requests to go to sleep, the host receives the request and allows it as long as there is not data to be exchanged between the host and the device. It will be apparent, however, that systems operating under other WUSB specifications, if developed, might do this differently, and the present system and method can be compatible with other such specifications.

When in the pseudo sleep mode, the connection between the device and each host will be inactive for a predefined time, during which time interval the device can again search for new hosts. Specifically, during this inactive time interval, at the expiration of a time variable indicated as SEARCH TIME (step 110), the device will again search all WUSB wireless bands or frequencies for other hosts that want to connect to it (steps 102, 103). If another host is found, the device connects to the host (step 106), puts the connection into sleep mode, and then goes back into pseudo sleep (step 108) again. By continuously cycling through this procedure, the device can connect to multiple hosts.

Whenever the device cycles through the host search procedure outlined above, but does not find a new host, it will next consider whether it is time for the device to wake (step 112). WUSB devices normally wake periodically to determine whether there is data that is to be transferred to or from a connected host. Accordingly, the controller of the device will be programmed with time cue variables for each host, such as WAKE TIME, which will periodically signal the device to wake the connection to a particular host. If, after cycling through the host search procedure the WAKE TIME variables are not satisfied, the device will remain in the pseudo sleep mode, returning via arrow 114 to block 108.

However, when any of the WAKE TIME variables are satisfied, the device will awake the connection to the associated host (step 116), and check for new data (step 118). When a device "wakes" the connection to a host, the host can start exchanging data with the device if it has data to exchange. A host that has data to be exchanged with the WUSB device is referred to as a "data host." If there is no data to exchange, the device will put the host connection to sleep and return to the pseudo sleep mode (block 108), as indicated by arrow 120. If there is data to exchange, the device will shift to the data transmit/receive mode (step 122). When the data exchange is completed, the device puts the host connection to sleep and returns to pseudo sleep mode (block 108), as indicated by arrow 124.

It will be apparent that data exchange between the host and the device may take longer than the preprogrammed WAKE TIME interval, with the result that other hosts that are connected to the device may have data to exchange at the same time. To accommodate this possibility, while the data exchange is going on, the device will still periodically query the WAKE TIME variables (step 126) to check for data from other hosts. If WAKE TIME is not satisfied, the device will simply return, as indicated by arrow 130, to the transmit/receive data step (122). However, when a WAKE TIME variable is satisfied while the device is receiving or transmitting data, the device will awake the connection to the other host for which the WAKE TIME variable has been satisfied (step 128), and send a busy signal (step 132) to the other host to let it know that the device cannot accept the proffered data at the moment. The device then returns the other host connection to the pseudo sleep mode (step 134) and continues with the data exchange (step 122). When the data exchange is completed, the device will then put the active host connection into sleep mode and return to pseudo sleep (block 108) and the normal mode of periodically scanning for other hosts and data from connected hosts, as described above. Consequently, soon after completing data exchange with one host, the device will automatically awake to the next host having data to exchange and proceed with that action.

Since the default state for all connections is the pseudo sleep state (which appears to the hosts as true "sleep") this approach allows the device to constantly scan for other hosts that want to connect and use its services. The connections can be on different bands, allowing the device to be connected to multiple hosts and be a part of multiple WUSB clusters.

The multiple host method described herein can also apply to dual-role devices. The current WUSB specifications provide for dual-role devices, which are WUSB devices that also include limited host capabilities (though the specifications do not indicate how these devices are to be implemented). An example of a dual-role device is depicted in FIG. 3. In this figure, the printer 58 that is shared by WUSB clusters 50a and 50b is also a dual-role device that acts as a host to digital camera devices, allowing these devices to download digital photograph information directly to the printer, without the need for an intermediate host device. Consequently, as shown in FIG. 3, a digital camera 64 can have a WUSB connection directly to the printer 58, without the need for any connection to another host device or any of the hosts (52a, 52b) that are connected to the printer. This allows a user to walk up to the WUSB printer with the digital camera, and, regardless of the printer's WUSB connection to any other devices, connect the portable device and make prints, without having to connect to any other device or perform any other action.

The method used here to enable multiple hosts to connect to one WUSB device can also be used to implement dual-role device capability. By using the technique described herein, a dual-role device can become a WUSB host while its connections to other hosts are all in pseudo sleep mode. If dual-role device capability is used, the dual-role device can normally operate in host mode, while also regularly checking its connections to other hosts (which are in pseudo sleep mode) for data they wish to exchange with the dual-role device in device mode, as described earlier.

At the same time, the dual-role device can also form part of a multiple host arrangement. Specifically, as shown in FIG. 3, the digital camera 54 that is part of the first cluster 50a can be simultaneously wirelessly interconnected to the PC host 52a, as well as the dual-role printer 58, as indicated by arrow 66. This type of dual-connection arrangement can be very desirable in many situations. For example, it can be desirable for a digital camera where a user desires to print digital photographs to a CD using CD writing hardware and software that are part of a PC (e.g. the host 52a), and also print photographs using the printer device 58. While the respective host and dual-role devices shown in FIG. 3 are part of the cluster 50a of which the camera 54 is a part, it will be apparent that the printer or host PC or both could just as easily be parts of different clusters.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A method for connecting a wireless USB (WUSB) device to multiple WUSB hosts, comprising the steps of:
    a) connecting the wireless USB device to a first WUSB host;
    b) putting the connection with the first WUSB host into a pseudo sleep mode;
    c) scanning a radio frequency spectrum for a new WUSB host that is available for connection to the device;
    d) connecting the device to the new WUSB host;
    e) putting the connection with the new WUSB host into a pseudo sleep mode, wherein the pseudo sleep mode is a low rower mode adopted by the WUSB device when interconnected to the USB host and wherein during the pseudo sleep mode the WUSB device periodically searches for new USB hosts and when a new USB host is found, making a new connection to the found new USB host, putting the new connection into sleep mode, and going back into pseudo sleep mode.

2. A method in accordance with claim 1, further comprising the step of repeating steps (c) through (e) periodically to search for additional new WUSB hosts.

3. A method in accordance with claim 1, wherein the steps of putting the connections with the first WUSB host and new WUSB host into pseudo sleep mode comprises the steps of:
    f) requesting the respective WUSB host to allow the device to go into sleep mode; and
    g) putting the connection with the respective WUSB device into the pseudo sleep mode.

4. A method in accordance with claim 1, further comprising the steps of:
    f) scanning the radio frequency spectrum of all WUSB hosts that are connected to the device for a data host having new data to be exchanged; and
    g) exchanging data with the data host.

5. A method in accordance with claim 4, further comprising the step of putting the connection with the data host into pseudo sleep mode.

6. A method in accordance with claim 1, wherein the device comprises a dual role device, and further comprising the step of connecting a second wireless USB device to the dual role device, with the dual role device operating in host mode.

7. A method in accordance with claim 4, further comprising the step of repeating steps (f) through (g) periodically to search for new data hosts.

8. A method in accordance with claim 4, wherein the step of scanning the radio frequency spectrum of connected WUSB hosts for new data hosts comprises the steps of:
   h) waking a connection with a potential data host; and
   i) checking for data to be exchanged with the potential data host.

9. A method in accordance with claim 8, wherein the step of waking a connection with a potential data host comprises the steps of:
   j) evaluating a time cue variable for a connected host having a connection in sleep mode; and
   k) awakening the connection to the connected host for which the time cue variable is satisfied.

10. A method in accordance with claim 4, further comprising the steps of:
   h) scanning the radio frequency spectrum of all WUSB hosts that are connected to the device for a new potential data host, while exchanging data with the data host;
   i) transmitting a busy signal to the new potential data host if there is data to be transmitted; and
   j) returning the connection to the new potential data host to pseudo sleep mode.

11. A system for simultaneously associating a wireless USB device with multiple wireless USB hosts, comprising:
   a) a wireless USB device;
   b) a plurality of wireless USB hosts; and
   c) means for simultaneously interconnecting the wireless USB device with more than one of the wireless USB hosts:
   d) means for placing a connection between the wireless USB device and the USB host into a pseudo sleep mode configured to be a low power mode adopted by the WUSB device when interconnected to the USB host and wherein during the pseudo sleep mode the WUSB device is configured to periodically search for new USB hosts and when a new USB host is found, the WUSB device is configured to make a new connection to the found new USB host, put the new connection into sleep mode, and go back into pseudo sleep mode.

12. A system in accordance with claim 11, wherein the means for simultaneously interconnecting the wireless USB device with more than one of the wireless USB hosts comprises programming, associated with the wireless USB device, including:
   e) a scanning routine, configured to cause the device to scan a radio frequency spectrum for a new WUSB host that is available for connection;
   f) a connection routine, configured to connect the device with the new WUSB host; and
   g) a sleep routine, configured to request the new WUSB host to allow the device to go into sleep mode.

13. A system in accordance with claim 12, wherein the programming further comprises:
   h) a repeat function, configured to cause the device to repeat program steps (d) through (f) repeatedly.

14. A system in accordance with claim 12, wherein the programming further comprises:
   i) a time cue routine, configured to indicate when a connection to a first host is to be awakened;
   j) a wake routine, configured to wake the connection to the first host;
   k) a data query routine, configured to determine whether there is data to exchange with the first host;
   l) a data transfer routine, for exchanging data with the first host if there is data to be exchanged; and
   m) a sleep routine, configured to return the connection with the first host to a pseudo sleep mode if there is no data to exchange, or after data exchange is complete.

15. A system in accordance with claim 14, wherein the programming further comprises:
   n) a time cue routine, configured to indicate when a connection to a second host is to be awakened while data transfer is occurring between the device and the first host;
   o) a wake routine, configured to wake the connection to the second host;
   p) a busy signal routine, configured to send a busy signal to the second host; and
   q) a sleep routine, configured to return the connection with the second host to a pseudo sleep mode.

16. A wireless USB system, comprising:
   a) a wireless USB device;
   b) a plurality of wireless USB hosts, simultaneously operationally interconnected with the wireless USB device;
   c) means for placing a connection between the wireless USB device and the USB host into a pseudo sleep mode configured to be a low power mode adopted by the WUSB device when interconnected to the USB host and wherein during the pseudo sleep mode the WUSB device is configured to periodically search for new USB hosts and when a new USB host is found, the WUSB device is configured to make a new connection to the found new USB host, put the new connection into sleep mode, and go back into pseudo sleep mode.

17. A wireless USB system in accordance with claim 16, wherein the wireless USB device comprises a plurality of wireless USB devices.

18. A wireless USB system in accordance with claim 17, wherein the plurality of wireless USB devices include a wireless USB device that is operationally interconnected to only one of the plurality of wireless USB hosts.

19. A wireless USB system in accordance with claim 16, wherein the wireless USB device comprises a dual-role device.

20. A wireless USB system in accordance with claim 19, further comprising a second wireless USB device operationally interconnected with the dual-role device, with the dual-role device operating in host mode, and the operational interconnections of the dual-role device to the plurality of wireless hosts operating in pseudo sleep mode.

* * * * *

UNITED STATES PATENT AND TRADEMARK OFFICE
CERTIFICATE OF CORRECTION

| | |
|---|---|
| PATENT NO. | : 7,478,188 B2 |
| APPLICATION NO. | : 11/446437 |
| DATED | : January 13, 2009 |
| INVENTOR(S) | : David B. Patton |

Page 1 of 1

It is certified that error appears in the above-identified patent and that said Letters Patent is hereby corrected as shown below:

In column 6, line 38, in Claim 1, delete "rower" and insert -- power --, therefor.

In column 7, line 32, in Claim 11, delete "host:" and insert -- host; --, therefor.

Signed and Sealed this

Twenty-seventh Day of October, 2009

David J. Kappos
*Director of the United States Patent and Trademark Office*